United States Patent
Voschina et al.

(10) Patent No.: US 9,072,120 B2
(45) Date of Patent: Jun. 30, 2015

(54) METHODS CIRCUITS AND SYSTEMS FOR PROVIDING CELLULAR BASE STATION FUNCTIONALITY AT ONE OR MORE NODES OF A DATA NETWORK

(75) Inventors: David Voschina, Givataim (IL); Roy Kinamon, Tel Aviv (IL)

(73) Assignee: GO NET SYSTEMS LTD., Tel Aviv (IL)

( * ) Notice: Subject to any disclaimer, the term of this patent is extended or adjusted under 35 U.S.C. 154(b) by 1027 days.

(21) Appl. No.: 12/506,359

(22) Filed: Jul. 21, 2009

(65) Prior Publication Data
US 2010/0067426 A1 Mar. 18, 2010

Related U.S. Application Data (60) Provisional application No. 61/082,236, filed on Jul. 21, 2008.

(51) Int. Cl.
*H04W 88/08* (2009.01)
*H04W 88/12* (2009.01)

(52) U.S. Cl.
CPC .............. *H04W 88/08* (2013.01); *H04W 88/12* (2013.01)

(58) Field of Classification Search
CPC ............................. H04W 4/00; H04L 27/2646
USPC ................................................... 370/328–331
See application file for complete search history.

(56) References Cited

U.S. PATENT DOCUMENTS

| | | | |
|---|---|---|---|
| 2004/0086027 A1* | 5/2004 | Shattil ........................... | 375/146 |
| 2004/0235472 A1* | 11/2004 | Fujishima et al. ............ | 455/434 |
| 2007/0115874 A1* | 5/2007 | Usuda et al. .................. | 370/328 |
| 2007/0140104 A1* | 6/2007 | Lim et al. ...................... | 370/208 |
| 2007/0263743 A1* | 11/2007 | Lee et al. ....................... | 375/267 |
| 2008/0205329 A1* | 8/2008 | Dominique et al. .......... | 370/328 |
| 2008/0304590 A1* | 12/2008 | Sundberg et al. ............. | 375/260 |
| 2008/0316934 A1* | 12/2008 | Nibe .............................. | 370/252 |
| 2010/0014494 A1* | 1/2010 | Schmidt et al. ............... | 370/338 |

\* cited by examiner

*Primary Examiner* — Brandon Renner
(74) *Attorney, Agent, or Firm* — Vladimir Sherman; Professional Patent Solutions (57) ABSTRACT

Disclosed are methods, circuits and systems for providing cellular base station functionality at one or more nodes of a data network. Baseband traffic and at least a portion of radio unit signaling may be transmitted over a data network from a base station (controller) to a radio equipped network appliance. The network appliance may emulate a native radio unit of the base station controller and may provide cellular base station services to one or more cellular devices. Baseband traffic and at least a portion of the radio unit signaling received from the one or more cellular devices may be transmitted from the network appliance to the base station controller over the data network.

9 Claims, 5 Drawing Sheets

METHODS CIRCUITS AND SYSTEMS FOR PROVIDING CELLULAR BASE STATION FUNCTIONALITY AT ONE OR MORE NODES OF A DATA NETWORK

FIELD OF THE INVENTION

The present invention relates generally to the field of communication. More specifically, the present invention relates to methods, circuits and systems for providing cellular base station functionality at one or more nodes of a data network.

BACKGROUND

Since the development of crude communication systems based on electrical signals, the world's appetite for more and more advanced forms of communication has continually increased. From wired cable networks over which operators would exchange messages using Morse-Code, to the broadband wireless networks of today, whenever technology has provided a means by which to communicate more information, people have found a use for that means, and have demanded more.

Modern communication networks are best characterized by features such as high bandwidth/data-rate, complex communication protocols, various transmission mediums, and various access means. Fiber optic networks span much of the world's surface, acting as long-haul networks for carrying tremendous amounts of data between distant points on the globe. Cable and other wire-based networks supplement coverage provided by fiber optic networks, where fiber networks have not yet been installed, and are still used as part of local area networks ("LAN"), for carrying data between points relatively close to one another. In addition to wire-based networks, wireless networks such as cellular networks (e.g. 2G, 3G, CDMA, WCDMA, WiFi, etc.) may be used to supplement coverage for various devices (e.g. cell phone, wireless IP phone, wireless internet appliance, etc.) not connected to a fixed network connection. Wireless networks may act as complete local loop networks and may provide a complete wireless solution, where a communication device in an area may transmit and receive data from another device entirely across the wireless network.

With the proliferation of communication networks and the world's growing reliance upon them, proper performance is crucial. High data rates and stable communication parameters at low power consumption levels are highly desirable for communication devices. However, degradation of signal-to-noise ratio ("SNR") as well as bit energy to noise ratio ("Eb/No") and interference ratios such as Carrier-to-Interference ("C/I") ratio occur to a signal carried along a transmission medium (e.g. coax, unshielded conductor, wave guide, open air or even optical fiber or RF over fiber). This degradation and interferences may occur in TDMA, CSMA, CDMA, EVDO, WCDMA and WiFi networks respectively. Especially in the field of cellular communication, there has been a constant push for improved technologies intended to compensate for SNR degradation and to improve data rates and connection reliability.

3GPP LTE (Long Term Evolution) is the name given to a project within the Third Generation Partnership Project to improve the UMTS mobile phone standard to cope with future technology evolutions. Goals include improving spectral efficiency, lowering costs, improving services, making use of new spectrum and reframed spectrum opportunities, and better integration with other open standards. The LTE air interface will be added to the specification in Release 8 and can be found in the 36-series of the 3GPP specifications. Although an evolution of UMTS, the LTE air interface is a completely new systems based on OFDMA in the downlink and SC-FDMA (DFTS-FDMA) in the uplink that efficiently supports multi-antenna technologies (MIMO). The architecture that will result from this work is called EPS (Evolved Packet System) and comprises E-UTRAN (Evolved UTRAN) on the access side and EPC (Evolved Packet Core) on the core side.

Much of the 3GPP standard will be oriented around upgrading UMTS to a so-called fourth generation mobile communications technology, essentially a wireless broadband Internet system with voice and other services built on top.

The Standard Includes:

Peak download rates of 326.4 Mbit/s for 4×4 antennas, 172.8 Mbit/s for 2×2 antennas for every 20 MHz of spectrum.

Peak upload rates of 86.4 Mbit/s for every 20 MHz of spectrum[2]

5 different terminal classes have been defined from a voice centric class up to a high end terminal that supports the peak data rates. All terminal will be able to process 20 MHz bandwidth.

At least 200 active users in every 5 MHz cell. (i.e., 200 active data clients)

Sub-5 ms latency for small IP packets

Increased spectrum flexibility, with spectrum slices as small as 1.5 MHz (and as large as 20 MHz) supported (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.) Limiting sizes to 5 MHz also limited the amount of bandwidth per handset Optimal cell size of 5 km, 30 km sizes with reasonable performance, and up to 100 km cell sizes supported with acceptable performance Co-existence with legacy standards (users can transparently start a call or transfer of data in an area using an LTE standard, and, should coverage be unavailable, continue the operation without any action on their part using GSM/GPRS or W-CDMA-based UMTS or even 3GPP2 networks such as CDMA or EV-DO)

Supports MBSFN (Multicast Broadcast Single Frequency Network). This feature can deliver services such as Mobile TV using the LTE infrastructure, and is a competitor for DVB-H-based TV broadcast.

Release 8's air interface, E-UTRA (Evolved UTRA, the E-prefix being common to the evolved equivalents of older UMTS components) may be used by UMTS operators deploying their own wireless networks. It's important to note that Release 8 is intended for use over any IP network, including WiMAX and WiFi, and even wired networks.

The proposed E-UTRA system uses OFDMA for the downlink (tower to handset) and Single Carrier FDMA (SC-FDMA) for the uplink and employs MIMO with up to four antennas per station. The channel coding scheme for transport blocks is turbo coding and a contention-free quadratic permutation polynomial (QPP) turbo code internal interleaver.

The use of OFDM, a system where the available spectrum is divided into thousands of very thin carriers, each on a different frequency, each carrying a part of the signal, enables E-UTRA to be much more flexible in its use of spectrum than the older CDMA based systems that dominated 3G. CDMA networks require large blocks of spectrum to be allocated to each carrier, to maintain high chip rates, and thus maximize efficiency. Building radios capable of coping with different chip rates (and spectrum bandwidths) is more complex than creating radios that only send and receive one size of carrier, so generally CDMA based systems standardize both. Standardizing on a fixed spectrum slice has consequences for the operators deploying the system: too narrow a spectrum slice would mean the efficiency and maximum bandwidth per handset suffers; too wide a spectrum slice, and there are deployment issues for operators short on spectrum. This became a major issue with the US roll-out of UMTS over W-CDMA, where W-CDMA's 5 MHz requirement often left no room in some markets for operators to co-deploy it with existing GSM standards.

OFDM has a link spectral efficiency greater than CDMA, and when combined with modulation formats such as 64QAM, and techniques as MIMO, E-UTRA has proven to be considerably more efficient than W-CDMA with HSDPA and HSUPA.

The subcarrier spacing in the OFDM downlink is 15 kHz and there is a maximum of 1200 subcarriers available. Number of subcarriers is dependent on the used bandwidth (1.4 MHz and up to 20 Mhz), subcarriers don't occupy 100% of the used bandwidth as Cyclic Prefixes (Guards) occupies a part of it. The Mobile devices must be capable of receiving all subcarriers but a base station need only support transmitting 72 subcarriers. The transmission is divided in time into time slots of duration 0.5 ms and subframes of duration 1.0 ms. A radio frame is 10 ms long.

Supported modulation formats on the downlink data channels are QPSK, 16QAM and 64QAM.

The currently proposed uplink uses SC-FDMA multiplexing, and QPSK or 16QAM (64QAM optional) modulation. SC-FDMA is used because it has a low Peak-to-Average Power Ratio (PAPR). Each mobile device has at least one transmitter. If virtual MIMO/Spatial division multiple access (SDMA) is introduced the data rate in the uplink direction can be increased depending on the number of antennas at the base station. With this technology more than one mobile can use the same resources.

Spectrum aggregation is considered in LTE-Advanced for supporting large system bandwidths. The basic idea is to aggregate multiple, non-contiguous spectral components—centered around different carriers—in order to form the desired full system bandwidth. This allows reusing existing spectral bands (e.g. those of UMTS or LTE Rel8, with bandwidths of 1.4-20 MHz each) within a single system, enlarging its total bandwidth and hence the peak rate per user.

The use of multiple subcarriers in downlinks and uplinks (herein after also referred to multi-carriers or multiple carriers) raises certain power control issues. Uplink power control (PC) is a very important ingredient in cellular systems, required for compensating for path-loss of signals transmitted by different users in the uplink. It is used for maintaining acceptable Interference-rise over Thermal levels (IoT), for achieving a desired QoS, and having a reliable control data channel. In the LTE cellular standard, the uplink PC is based on fractional power control. The path-loss is fractionally compensated depending on cell-specific parameters. These parameters are signaled by the eNode-B to the user equipment ("UE") via higher layers (e.g. RRC), and additionally the eNode-B sends TPC commands at a higher rate for compensating the estimation errors of the UE measurements. The UE estimates the path-loss, and based on the PC parameters and the TPC commands adjusts its transmission power.

As data rates and service requirements for base station functionality increase, there has developed a trend for increasing the numbers of smaller base stations. Constraints in available space and the cost associated with deploying and operating large numbers of base stations is, however, a limiting factor. Therefore, there is a need for methods, circuits and systems for providing base station functionality at one or more nodes of a distributed data network.

SUMMARY OF THE INVENTION

The present invention is a method, circuit and system for providing cellular base station functionality at one or more nodes of a data network. According to some embodiments of the present invention, one or more radio equipped data network appliances (e.g. femto base stations) may engage in a communication session with a cellular base station and/or a base station controller over a distributed data network (e.g. Transmission Control Internet Protocol TCP/IP Network, switched data network, frame relay network, etc.). According to some embodiments of the present invention, the communication session between the base station controller and the network appliance may include (e.g. encapsulated and/or packetized) radio unit signaling and downlink baseband data/traffic. Radio Circuitry (e.g. a Radio Frequency Transceiver) on one or more of the network appliances may emulate a native cellular base station radio unit of the cellular base station controller based on the signaling and downlink baseband data received from the base station controller via the network communication session. According to some embodiments of the present invention, each of two or more separate network appliances, each located at a separate location, may emulate the operation of the base station's radio unit and may each provide cellular base station functionality/services to one or more mobile stations (e.g. cellular phones or cellular modems).

A radio equipped data network appliance according to embodiments of the present invention may receive uplink signal(s), including message content and control signaling, from a mobile station and may demodulate the uplink signal(s). The demodulated uplink signal(s) may be encapsulated and/or packetized by the network appliance and forwarded to the base station controller via the data network communication session. De-encapsulation and/or depacketizing circuitry functionally associated with the base station controller may convert data received from one or more network appliances and provide the data and/or signaling (i.e. signaling and message content) to the controller in a format substantially similar to the output of a native base station radio unit. According to further embodiments, uplink data received from each of two or more separate network appliances may be de-encapsulated/depacketized separately and then combined into a unified signal provided to the base station controller, thereby emulating the output of a single base station radio unit. According to some embodiments of the present invention, the base station controller may function as if it were interacting or utilizing a single native radio unit or a set of native radio units.

According to embodiments of the present invention, the base station controller or a circuit associated therewith may handle substantially all of the Media Access Control ("MAC") addressing functionality of the radio equipment/unit on the network appliance. The base station controller may provide the radio equipment on the network appliance with the relevant cellular network MAC related parameters and/or data through the distributed network communication session. MAC related parameters and/or data related to one or more mobile cellular devices connected to the network appliance may be transmitted back to the base station controller via the distributed network communication session.

According to further embodiments of the present invention, Physical Layer functionality relating to the one or more mobile cellular devices connecting to the network appliance may be substantially handled by the network appliance radio equipment. One or more circuits functionally associated with base station controller may emulate native radio unit signaling indicating proper or faulty physical layer operation. According to further embodiments of the present invention, the emulated signaling may be based on data provided to the one or more emulating circuits by the network appliance over the communication session.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, numerous specific details are set forth. However, the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method, circuit and system for providing cellular base station functionality at one or more nodes of a data network. According to some embodiments of the present invention, one or more radio equipped data network appliances (e.g. femto base stations) may engage in a communication session with a cellular base station and/or a base station controller over a distributed data network (e.g. Transmission Control Internet Protocol TCP/IP Network, switched data network, frame relay network, etc.). According to some embodiments of the present invention, the communication session between the base station controller and the network appliance may include (e.g. encapsulated and/or packetized) radio unit signaling and downlink baseband data/traffic. Radio Circuitry (e.g. a Radio Frequency Transceiver) on one or more of the network appliances may emulate a native cellular base station radio unit of the cellular base station controller based on the signaling and downlink baseband data received from the base station controller via the network communication session. According to some embodiments of the present invention, each of two or more separate network appliances, each located at a separate location, may emulate the operation of the base station's radio unit and may each provide cellular base station functionality/services to one or more mobile stations (e.g. cellular phones or cellular modems).

A radio equipped data network appliance according to embodiments of the present invention may receive uplink signal(s), including message content and control signaling, from a mobile station and may demodulate the uplink signal(s). The demodulated uplink signal(s) may be encapsulated and/or packetized by the network appliance and forwarded to the base station controller via the data network communication session. De-encapsulation and/or depacketizing circuitry functionally associated with the base station controller may convert data received from one or more network appliances and provide the data and/or signaling (i.e. signaling and message content) to the controller in a format substantially similar to the output of a native base station radio unit. According to further embodiments, uplink data received from each of two or more separate network appliances may be de-encapsulated/depacketized separately and then combined into a unified signal provided to the base station controller, thereby emulating the output of a single base station radio unit. According to some embodiments of the present invention, the base station controller may function as if it were interacting or utilizing a single native radio unit or a set of native radio units.

According to embodiments of the present invention, the base station controller or a circuit associated therewith may handle substantially all of the Media Access Control ("MAC") addressing functionality of the radio equipment/unit on the network appliance. The base station controller may provide the radio equipment on the network appliance with the relevant cellular network MAC related parameters and/or data through the distributed network communication session. MAC related parameters and/or data related to one or more mobile cellular devices connected to the network appliance may be transmitted back to the base station controller via the distributed network communication session.

According to further embodiments of the present invention Physical Layer functionality relating to the one or more mobile cellular devices connecting to the network appliance may be substantially handled by the network appliance radio equipment. One or more circuits functionally associated with base station controller may emulate native radio unit signaling indicating proper or faulty physical layer operation. According to further embodiments of the present invention, the emulated signaling may be based on data provided to the one or more emulating circuits by the network appliance, over the communication session.

According to embodiments of the present invention, there is provided a radio equipped network appliance including a distributed network communication module adapted to engage in a communication session with a cellular base station controller. The appliance may include and radio frequency circuitry or equipment adapted to emulate a native radio unit of the base station controller in response to baseband and radio unit signaling data received from the controller over the communication session. The network communication module may also be adapted to transmit uplink baseband data to the base station controller.

According to further embodiments of the present invention, a cellular base station controller may include a distributed network communication module adapted to encapsulate and/or packetize downlink baseband traffic and at least a portion of native radio unit signaling and to transmit same over a distributed data network to a radio equipped network appliance. The distributed network communication module may be adapted to receive and forward to the controller uplink baseband data from the network appliance.

According to further embodiments of the present invention, there may be provided a base station extender including a signaling interceptor adapted to intercept downlink baseband traffic and at least a portion of radio unit signaling between a base station controller and a native radio unit of said base station. The extender may include a distributed network communication module functionally associated with said interceptor and adapted to encapsulate and/or packetize the intercepted traffic and radio unit signaling into a communication session with a radio equipped network appliance. The cellular base station extender may include a signal injector adapted to forward to the controller uplink baseband data received from the network appliance.

Exemplary Embodiments

Figure 1:
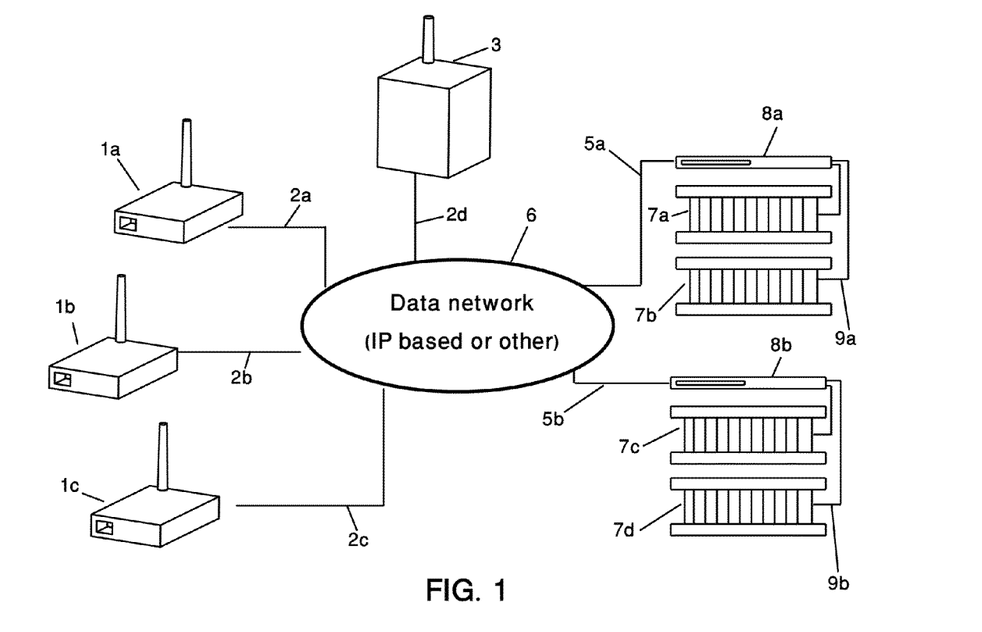
FIG. 1 is a system topology block diagram, in accordance with one embodiment of the present invention.

FIG. 1 illustrates the overall system topology. On the right, the figure includes a plurality of cellular base stations (one or more) 7a, 7b, 7c, 7d, without their radio unit connected, with lines 9a, 9b to a single or a few converter units 8a, 8b. The converter units, 8a, 8b, translate the signals coming out of (downlink), or to (uplink), the base stations 7a, 7b, 7c, 7d (which may be digital interface containing the IQ information as well as control data such as OBSAI RP3/RP3-01 or CPRI interfaces, or may be analog cables carrying the modulated signals over Intermediate Frequency (IF), or may be zero IF, but also may be any other interface conveying the information from the baseband unit to and from the RF unit) into (downlink), or from (uplink), the selected data protocol that is then formatted to or from any switched or routed protocol such as Ethernet, IP, IPX or any other protocol selected for this purpose.

The packets are then routed via the network 6, through the lines 2a, 2b, 2c, 2d, to or from the end nodes 1a, 1b, 1c, 3, to be formatted modulated and transmitted to the air interface or received from the air interface demodulated and formatted.

On the uplink, the transmission is received by the radio units 1a, 1b, 1c, 3 and processed the minimal required processing till line rate is achieved (usually decision on constellation point). After decisions on the modulated signal are made the information is formatted and wrapped in any switched or routed data protocol and sent via lines 2a, 2b, 2c, 2d to the network 6.

The network transfers the packets via interfaces 5a, 5b to the converter units 8a, 8b which decapsulate the packets and send the information in the format expected by the base station 7a, 7b, 7c, 7d, usually to the baseband card.

The network 6 can be any switched or routed network but can also be a point to point link electrical, optical or radio, as well as any tunnel over other network.

Figure 2:
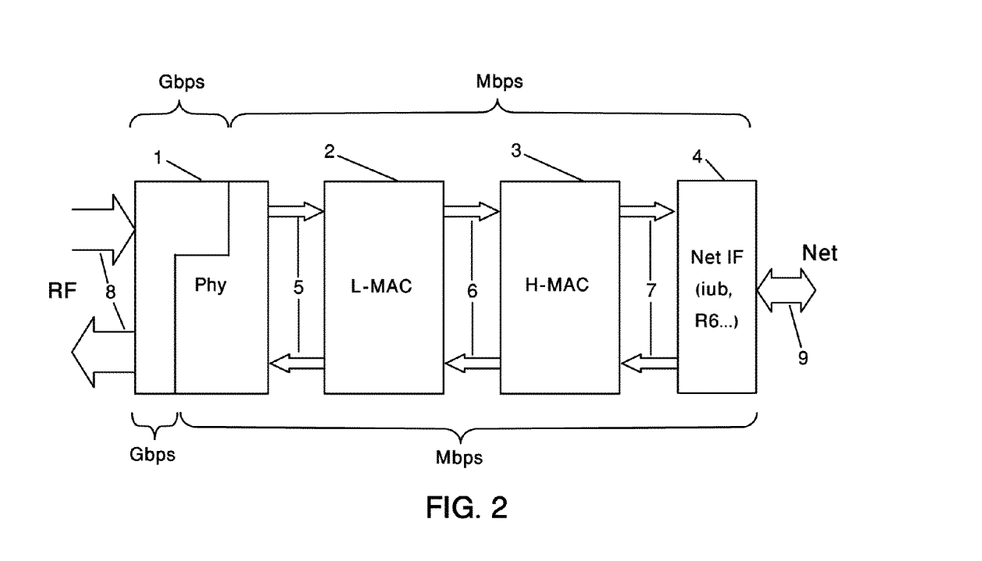
FIG. 2 is a block diagram of a base band card, in accordance with one embodiment of the present invention.

FIG. 2 illustrates a high level block diagram of a typical wireless and specifically a WiMAX base band card. The disclosed embodiments may be applicable to any cellular technology and will be illustrated here on a WiMAX baseband card. It is to be understood that other technologies and embodiments having slight changes which does not change the basic structure and notion of this system are also covered by the disclosed embodiments.

In one embodiment, a generic high level block diagram of a baseband card may contain MAC functionality optionally split logically into high layer MAC 3 functionality and Lower layer MAC 2 functionality, connected via interface 6. The MAC can be implemented in various ways of SW or HW. The MAC is connected via interface 5 to the PHY unit 1. The PHY unit 1 can be implemented in various ways and in many cases is comprised of several entities. One embodiment includes dedicated ASIC, FPGAs, SW usually running on DSP processors or may be any other technology or combinations.

The PHY 1, is connected with interface 8 usually to an RF unit, directly or via a digital or analog interface which may carry analog IF or may carry IQ information over digital interface such as OBSAI RP3 and RP3-01, CPRI or other digital interface or may optionally use numerous other techniques.

The higher layer MAC 3 may also be connected via interface 7, to an adaptor to the network 4, connecting it to a network one of optional numerous types of networks running over different optional media. The illustrated PHY includes two parts, the right part connected to the MAC 2, via interface 5, is running in rates in an order of magnitude of the traffic/information rates, usually 1-300 MBPS (Mega Bits Per Second), but can optionally be any rate, while the left part connected to the radio is running in higher rates due to the modulation process and usually can be in the ranges of 0.5-10 Giga Bits per Second (Gbps), but may also be any other rate.

Figure 3:
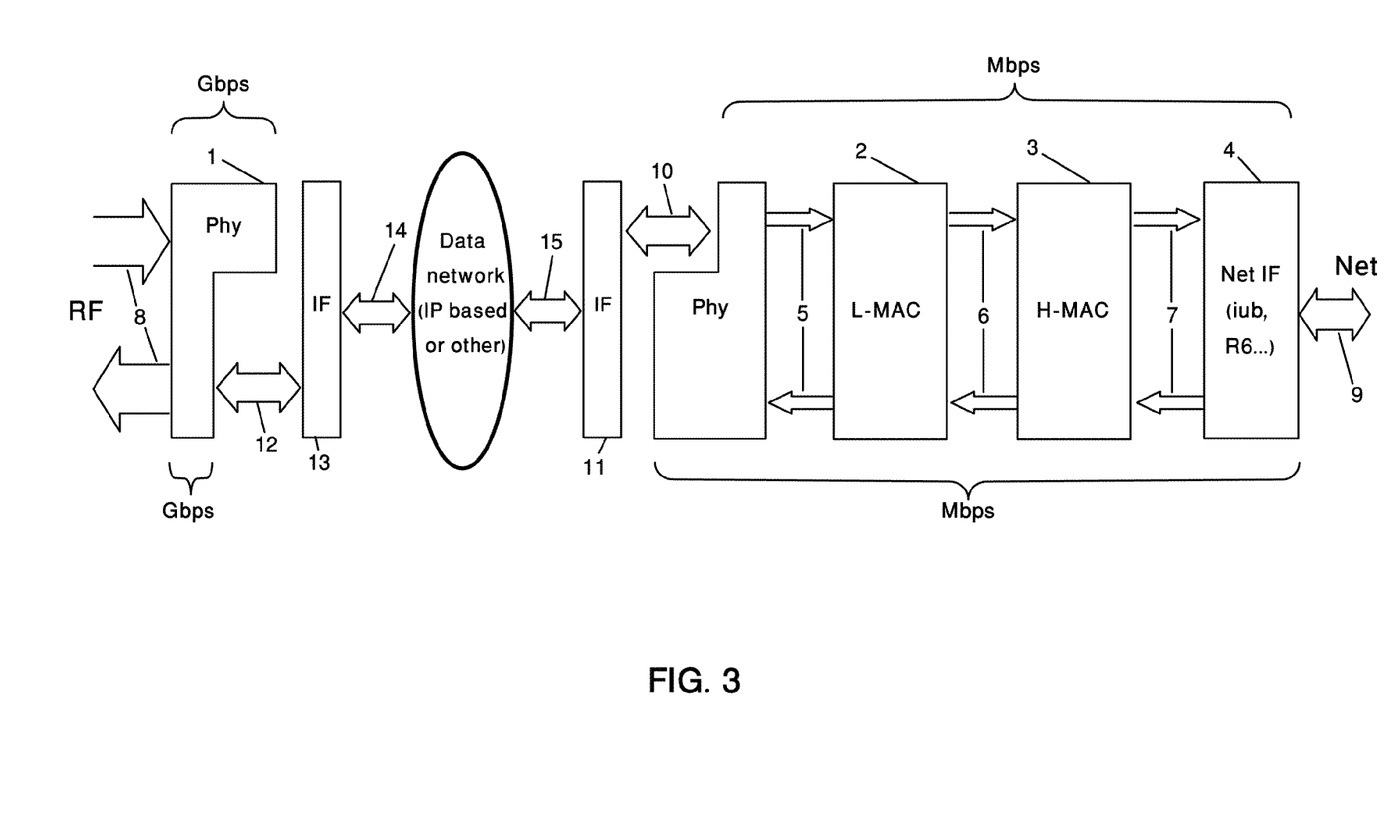
FIG. 3 is a block diagram of a baseband architecture, in accordance with one embodiment of the present invention.

FIG. 3 illustrates one embodiment of a block diagram illustrating a sub-component of the baseband processing. FIG. 3 illustrates the same elements as in FIG. 2, with the addition that the PHY entity 1, being split into 2, where all the data flow in rates close to the information rate (information rate denoted rates in the same order of magnitude as the data/information rate) is on the right while all the traffic flow with higher modulated rate resides on the left. These units are than interfaced with interfaces 10, 12 to converter units which encapsulate/decapsulate the information to be carried over any network. Such a network may be any switched or routed network, a point to point link running on any media type (electrical, optical, air interface etc.) or any other transportation method.

Figure 4:
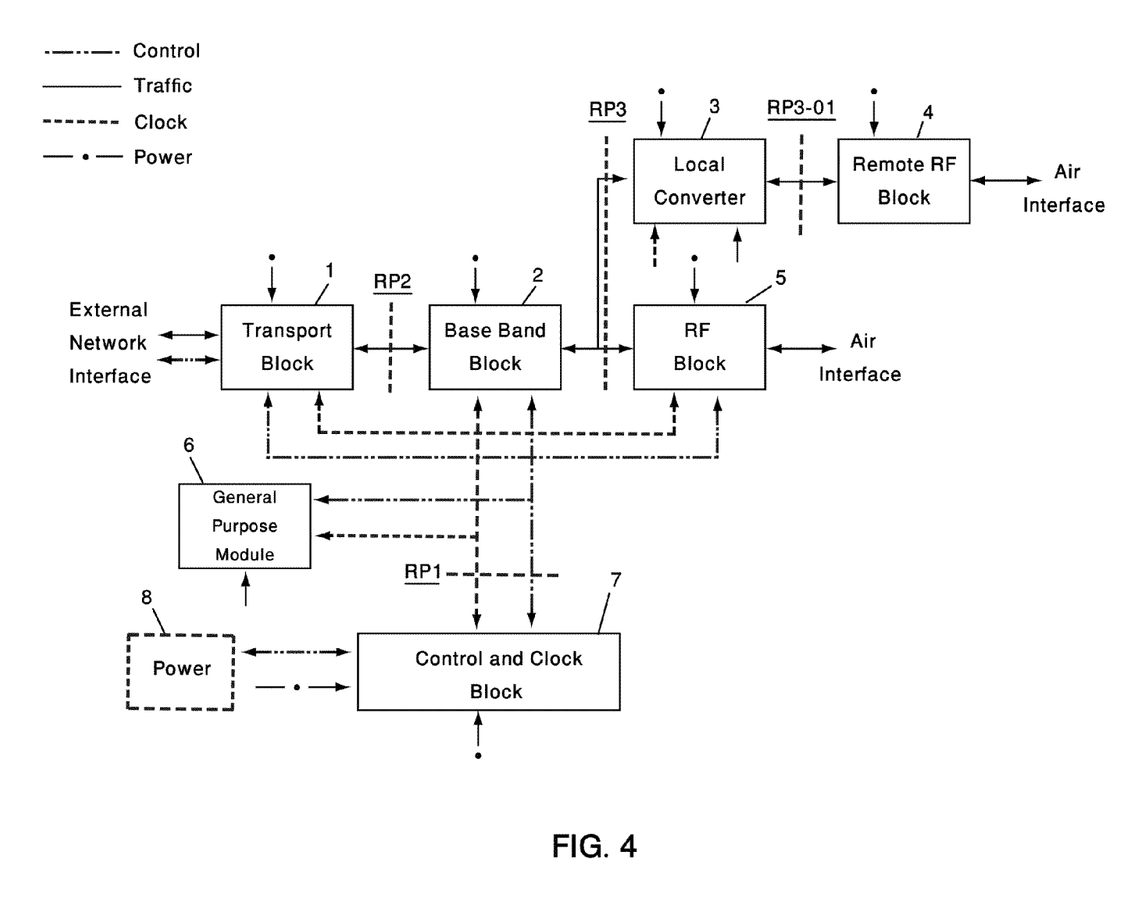
FIG. 4 illustrates a base station, in accordance with one embodiment of the present invention.

FIG. 4 illustrates a block diagram illustrating a base station block diagram as described by the OBSAI standard. FIG. 4 shows the reference architecture for the OBSAI base Transceiver station (BTS) reference architecture. The architecture elements comprises of the following:

Functional blocks comprised of the Transport Block, Control and Clock Block, Baseband Block and RF Block. A block represents a logical grouping of a set of functions and attributes. A block may comprise of one or more modules, each of which represents a Physical implementation of a subset of the block functions.

External network interface. Examples are: (Iub) to the Radio Network Controller (RNC) for 3GPP systems, (Abis) to the Base Station Controller (BSC) for 3GPP2 systems, R6 to ASN GW (centralized GW) or R3 to CSN (distributed GW) for 802.16/WiMAX system but not limited to.

External radio interface. Examples are Uu or Um to the User equipment (UE) for 3GPP systems (i.e., GSM or WCDMA), Um for 3GPP2 systems (i.e., CDMA) or R1 for IEEE802.16/WiMAX but not limited to.

Internal interfaces between BTS functional blocks designated as Reference Point 1 (RP1), Reference Point 2 (RP2), Reference Point 3 (RP3). RP1 includes control data and clock signals to all blocks. RP2 provides transport for user data between Transport Block and Baseband Block. RP3 provides transport for air Interface data between Baseband Block and RF Block. RP4 provides the DC power interface between the internal modules and DC power sources.

External Network Interfaces: The external network interface to the RNC, BSC, ASN-GW or other provided by the Transport Block shall transport user data and control data over a suitable communications path such as T1, E1, DS3, OC1, OC3, Ethernet, DSL or any other selected interface. For 3GPP systems for example, the logical interface is designated by the Iub described in 3GPP Series 25.4xx specifications. GSM/EDGE specifications are given in Series 3GPP/04.Xxx and 05.Xxx for air interface and 08.Xxx for transport interface. For 3GPP2 systems the logical interface is specified by the Abis interface in TIA/EIA IS-828-A specifications. Other interfaces also exist and defined in the corresponding standard organization.

The external interface to the UE transports user data and signaling data over the air interface. For 3GPP systems for example, the logical interface to UE is specified by the Uu described in 3GPP Series 26.4xx specifications for 3GPP2 systems the logical interface to UE is specified by the Um described in IS-2000 specifications. For IEEE802.16/WiMAX the interface to the Access Terminal is specified in the IEEE802.16-2004 and IEEE802.16e specifications. Other interfaces also exist and are defined in the corresponding standard organization.

Block Structure Each block in the reference architecture of FIG. 4 represents a logical separation of BTS functions in protocol processing. A block may comprise of one or more modules that execute a subset of block functions. A module represents a physical realization of block functions.

Reference Point Function: Reference Point 1 (RP1) interchanges control, performance, status, alarm and provisioning data between the Control and Clock block and other BTS blocks with the protocol specified in the OBSAI RP1 Specification document. RP1 also defines an open, standardized interface for exchange of clock and synchronization signals that meet the timing, frequency stability, phase noise and jitter constraints of supported air interfaces. The interface employs a common clock rate for generation of system clock signals for all blocks and modules within each block.

Reference Point 2 (RP2) interchanges user data packets between the transport Block and the Baseband Block with the protocol specified in the OBSAI RP2 Specification document.

Reference Point 3 (RP3) interchanges formatted air interface user and signaling data user between the Baseband Block and the RF Block with the protocol specified in the OBSAI Reference Point 3 Specification.

Figure 5:
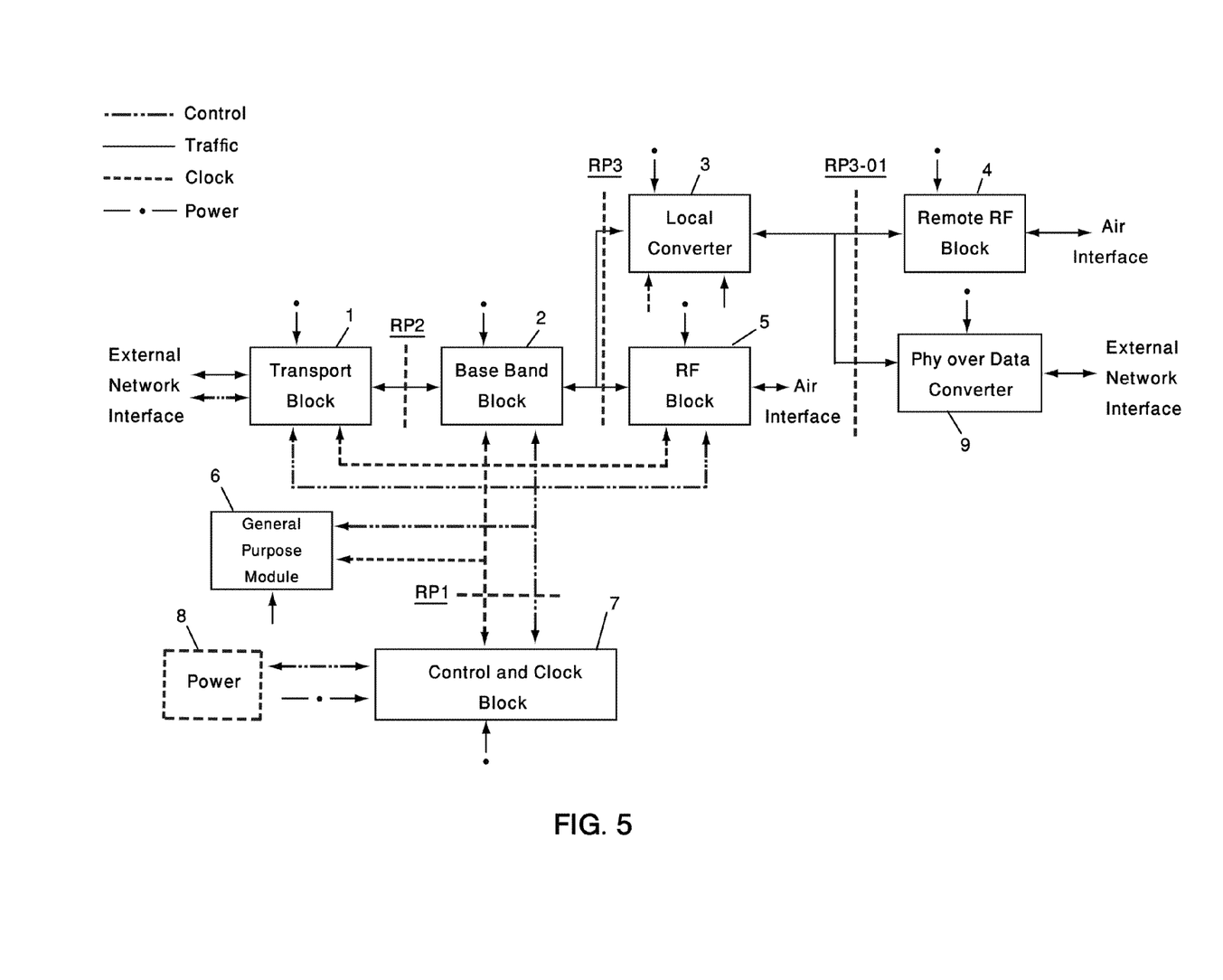
FIG. 5 illustrates a base station architecture based on OBSAI, in accordance with one embodiment of the present invention.

FIG. 5 illustrates a block diagram illustrating a diagram of a base station as described by the OBSAI standard with the addition of one embodiment of the discussed system. FIG. 5 is illustrating the same diagram as the OBSAI model described in FIG. 4, with the addition of the PHY over Data converter block 9 which is connected to the local converter via the RP3-01 interface. The converter unit can also be connected directly to the base band block 2, via the RP3 interface. On its right side the converter block 9, is connected to any type of external network carrying any protocol and using any media type whether switched, routed, TDM, point to point or any other and either electrical, optical or radio.

Figure 6:
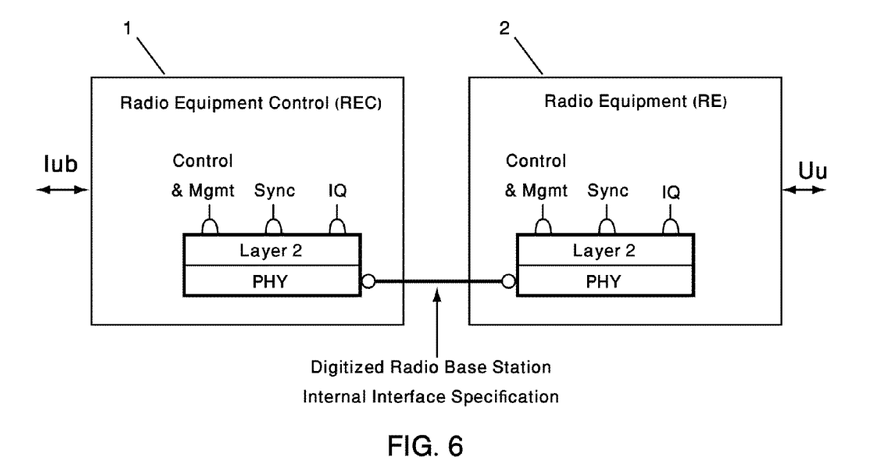
FIG. 6 illustrates CPRI architecture, in accordance with one embodiment of the present invention.

FIG. 6 illustrates a block diagram illustrating the CPRI standard model of the baseband RF connectivity. The Common Public Radio Interface (CPRI) is an industry cooperation aimed at defining a publicly available specification for the key internal interface of radio base stations between the Radio Equipment Control (REC) and the Radio Equipment (RE).

The REC contains the radio functions of the digital baseband domain, whereas the RE contains the analogue radio frequency functions. The functional split between both parts is done in such a way that a generic interface based on In-Phase and Quadrature (IQ) data can be defined.

For the UMTS radio access network as an example, the REC provides access to the Radio Network Controller via the Iub interface, whereas the RE serves as the air interface, called the Uu interface, to the user equipment.

For WiMAX as another example, the REC provides access to network entities (e.g. other BS, ASN-GW), whereas the RE serves as the air interface to the subscriber station/mobile subscriber station (SS/MSS).

In addition to the user plane data (IQ data), control and management as well as synchronization signals have to be exchanged between the REC and the RE. All information flows are multiplexed onto a digital serial communication line using appropriate layer 1 and layer 2 protocols. The different information flows have access to the layer 2 via appropriate service access points. This defines the common public radio interface illustrated in FIG. 6. The common public radio interface may also be used as a link between two REs in system architectures supporting networking between REs.

Figure 7:
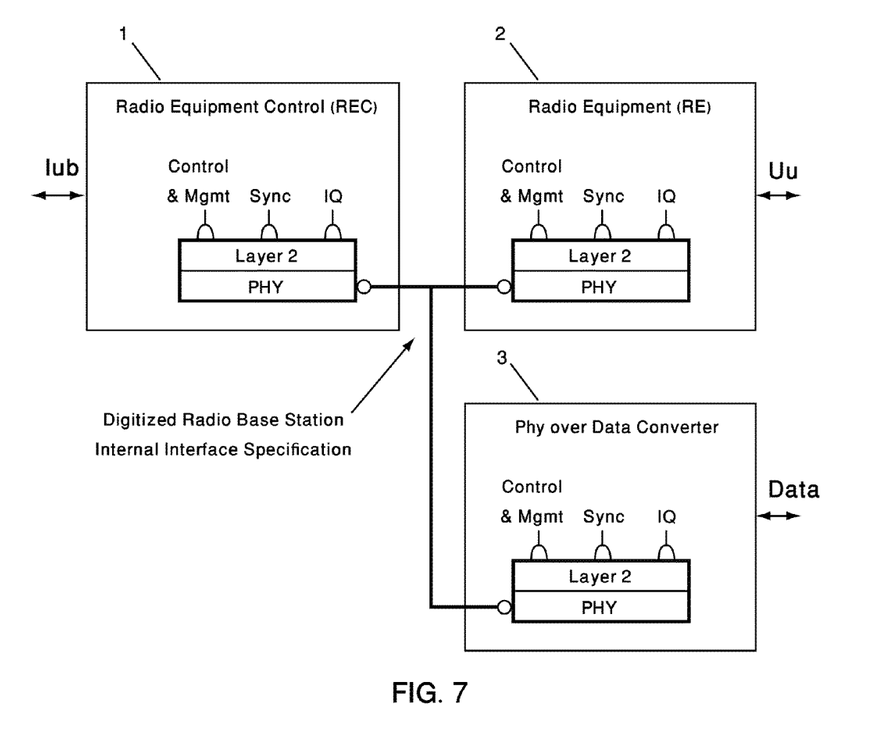
FIG. 7 illustrates CPRI architecture with an added converter, in accordance with one embodiment of the present invention.

FIG. 7 is a block diagram illustrating the CPRI standard model of the baseband RF connectivity with one embodiment of the system and method. In FIG. 7 one can see the basic CPRI bock diagram as in diagram 6 with the added PHY over data converter block 3, replacing or coming in addition to the RE block 2.

In downlink, the converter block 3 demodulates the IQ information residing in the interface specification reducing its rate to the information rate (a rate which is same order of magnitude as the information rate), and encapsulates it in any data interface together with the sync information and the control & management information. In the uplink, the reverse operation is created where data rate traffic is received from the network and adjusted to the high rate IQ interface. As such is also applied on the other information elements such as clock syncs, ranging, calibration and more.

The data interface can again be any type of protocol and network whether routed, switched, point to point or other and any type of media, such as electrical optical or radio interface.

Wireless Base Station

In one embodiment, the base station may be a standard wireless or cellular base station in any technology but not limited to, such as WCDMA, UMTS, HSDPA, HSUPA, CDMA, CDMA2000, GSM, EDGE, TDS-CDMA, WiMAX, and LTE or may be a proprietary base station in any protocol. The base station is usually comprised of an optional shelf with an optional control card and one or a few baseband cards.

The baseband card has a few forms of optional output interfaces such as an analog IF connection, or a digital connection usually running the IQ information as well as control, management and synchronizations. Other interfaces are possible as well but less common.

A potential digital interface may be one of the standardized/specified interfaces named as OBSAI or CPRI or any other standard or none standard/proprietary interface.

The baseband card is connected via this digital or analog interface to an RF module which has the task of transmitting and receiving the signals to and from the air. The radio can be attached physically to the baseband or in some distance using an interface (e.g. OBSI or CPRI) to connect it to the baseband.

Base station is the element in cellular and wireless systems responsible for receiving the information coding it and transmitting it to the air, as well as receiving it from the air decoding/demodulating it and sending it to the network/user.

An architecture of a base station is combined of one or many baseband processors/cards, one or many RF modules and few other optional elements. Such architecture can be seen in the OBSAI model describing a generic baseband structure and its interfaces. The architecture elements in the OBSAI model comprise the following functional blocks: the Transport Block, Control and Clock Block, Baseband Block and RF Block. A block represents a logical grouping of a set of functions and attributes. A block may comprise of one or more modules, each of which represents a physical implementation of a subset of the block functions.

External network interface. Examples are: (Iub) to the Radio Network Controller (RNC) for 3GPP systems, (Abis) to the Base Station Controller (BSC) for 3GPP2 systems, R6 to ASN GW (centralized GW) or R3 to CSN (distributed GW) for 802.16/WiMAX system but not limited to.

External radio interface. Examples are Uu or Um to the User equipment (UE) for 3GPP systems (i.e., GSM or WCDMA), Um for 3GPP2 systems (i.e., CDMA) or R1 for IEEE802.16/WiMAX but not limited to.

Internal interfaces between BTS functional blocks designated as Reference Point 1 (RP1), Reference Point 2 (RP2), Reference Point 3 (RP3). RP1 includes control data and clock signals to all blocks. RP2 provides transport for user data between Transport Block and Baseband Block. RP3 provides transport for air interface data between Baseband Block and RF Block. RP4 provides the DC power interface between the internal modules and DC power sources.

Description of each block and its functionality are described in the OBSAI system specification.

The base station may have numerous structures and variations mostly related to the wireless standard and the radio interface used.

The wireless standards may optionally be either proprietary or standardized such as WCDMA, CDMA, GSM/EDGE, UMTS, CDMA2000, HSDPA, HSUPA, TDS-CDMA, 802.16, LTE or other including any technology and protocol transferring information over the air.

Another configuration option is the connectivity between the baseband card/processor and the RF module. This connection conveys a high data rate relative to the original data rate, either in analog format, such as analog Intermediate Frequency (IF) over which data is modulated or such as digital interface carrying the modulated data (such as IQ). The difference between the analog and digital options is the location of the Analog to Digital Converter (ADC) and Digital to Analog Converter (DAC) which can be either on the baseband module/block (analog interface) or on the RF card/block (digital interface).

In addition these and/or additional interfaces convey additional signals and information such as synchronization, control, management, calibration, ranging and some additional functionalities.

In the past these interfaces were proprietary. Until lately, two efforts were done to standardize a few of the options. These efforts are called OBSAI (specifically RP3 and RP3-1) and CPRI.

Phy to Data Converter

In one embodiment, a converter is connected instead of the radio module in a standard wireless base station. The converter receives/sends the signals from the baseband card in any interface used by the baseband, if required it drops/increases the rate of the data to one close to the traffic rate (data rate) and encapsulates/decapsulates it in any selected protocol to enable its delivery to and from the radio node over the used network.

The converter has uplink and downlink parts, the downlink takes the data from the baseband, either by connecting internally to the last point (or anywhere before it) in the baseband card where the data is still in the lower data rates or by getting it in the high rates as generated by the baseband and inversing the last parts of the baseband card functionalities to get back to the lower required rate. After achieving the low rate, the converter encapsulates the data if needed in any selected protocol to be transferred on the selected type of network interface.

On the uplink the converter is performing the reverse operation; receiving the data in low rates such as after a constellation point was selected by the radio node and connects either directly to a baseband processor at that point in the baseband chain or by inversing the rate reduction and transmitting the high rate information to the baseband card in any way, such as analog IF, digital IQ or other as wanted by the selected baseband interface.

In its simplest form the data converter connects internally in the baseband processor to the last point (or somewhere before it) where data is still in its information rate (order of magnitude of this rate) both in downlink and uplink. The converter in this form just wraps/encapsulates and unwraps/decapsulates the information in the downlink and uplink respectively so it will be in a format acceptable by the selected network to transfer it to/from the radio node.

In one embodiment, the converter connects between the radio module and baseband card/processor, either standard or a proprietary interface used. In this scenario the converter has to drop the rate on the downlink and raise it again on the uplink.

Downlink: On the downlink the converter needs to send lower rate traffic. The traffic type will vary between the different standards, but the concept is the same. As an example we can optionally take the IQ interface commonly used in the digital case in many proprietary interfaces as well as in the standard OBSAI and CPRI interfaces (this is also applicable to the analog interface after being passed through ADC). While the baseband sends the data in high resolution having high number of bits per sample and high sampling rate, this information rate is not required for the radio node, so the number of bits can be reduced as well as the sample Nyquist rate that can be reduced significantly and not needed if only the mapped bits are sent.

By this method the data rate is reduced to a rate possible to transfer by the network. This is applicable in various ways to any modulation technique such as OFDM, OFDMA, CDMA, single carrier and many other modulation techniques.

In OFDMA for example the selected constellation point per tone/subcarrier can be sent and such reduce the traffic rate.

Uplink: On the uplink the opposite applies, where the converter gets low rate traffic from the network and transfers it to the higher rate expected by the baseband interface, either in analog or in digital format. This applies to many different technologies such as CDMA, OFDM, OFDMA, single carrier and many other modulation techniques. In OFDMA for example the converter can get the constellation points after being decoded/decided by the RF node and convert them to the desired IQ or analog information.

It is to be understood that the information carried over the network having the lower rate may vary depending on the different selected technique and the used wireless/cellular technology.

Network

In one embodiment, a network is used to transfer the information from and to the converter to or from any radio node on the network. The network can be any technology such as switched network (e.g. Ethernet), routed network (e.g. IP, IPX etc.), point to point links or any tunnel or proprietary network either point to point, point to multipoint or multipoint to multipoint.

The network can also be using any media, such as electrical, optical or wireless to transfer the information. The network can be any type of media and protocol used to carry the information from its source to destination. Such protocols can be for example Ethernet, IP, IPX, T1, E1, T3, T4, E3, E4, SONET, SDH, DSL, DOCSIS, PON or any other proprietary or standardized network protocol.

As such any connectivity between the source and destination of the information that carries the information from one to the other will be considered as network embodiments.

Radio Node

In one embodiment, the radio node is the end entity, used to transmit and receive the information from and to the air. The radio node contains the inverse functionality of the converter as well as the baseband parts missing in the centralized base station. The radio node either converts the data packets to information at higher rates (or analog format) that can be used by an RF module to transmit it on the air or receives the information from the air via the RF module and converts the information to lower rate data being able to send it to the converter over the network.

The radio node is the end node transmitting the information to the air. It can have the functionality of what is usually called a femtocell, a picocell, a microcell or a macrocell.

The radio node receives or transmits the information from or to the network and converts it to a format as required by the radio module it has. The translation is between the lower rate format on the network and the desired format of the radio module, such as IF or digital form such as IQ. The radio node is also responsible for transferring all control, management, synchronization, calibration, ranging and any other signal and message required to be replaced between the baseband processor and the RF node.

In one embodiment, the radio node includes the inverse functionality of the converter (in case the converter is used to translate traffic rates), and the remaining baseband processing plus a radio/RF module used to transmit the information on the air.

In one embodiment, the RF node may be implemented using Software Defined Radio (SDR) to be able to support the different wireless technologies with a single device or may be designed to address a specific technology.

Connections of Main Elements and Sub-Elements

In one embodiment, the main elements are connected as follows:

1. The baseband module in the base station is connected to the converter unit; this connection may be either proprietary or a standard one and may be in various positions over the baseband processing path.

2. The converter is connected on its other side to the network, and sends the information in a manner that it will be transferred to the destined radio node as well as received from the radio nodes.

3. The network is connected to a radio node (or many) transferring the information to and from it to the converter units.

All these connections may be one to one, one to many, or many to many, as such for example a few or a single converter box may connect to a few or a single base station. As such for example, also a single or few converters may connect to a network (or several networks) and one or many radio nodes may connect to the network on its other side.

Additional Alternative Embodiments

As the described embodiments work for many different technologies such as GSM, EDGE, UMTS, CDMA, WCDMA, CDMA2000, HSDPA, HSUPA, 802.16, LTE, UMB and many other standardized or proprietary techniques/systems, there might be several variants to the way the baseband signals are adjusted to be sent and received over the network in the order of magnitude of the information rate.

At its simplest, data on the downlink is taken in the baseband downlink path from a location where it is still in the information rate, or if already modulated the last parts of the modem/baseband are reversed so the rate would be reduced. In the uplink the reverse logic is being applied receiving lower rate information from the radio node over the network and either connecting it directly to the location in the baseband where it fits or re-modulating it to the higher rates expected at the baseband card entrance.

The same operation is being performed reversely on the radio node adjusting the information to its radio card/block.

For example WiMAX (802.16) and LTE use OFDMA for their downlink transmission and as such a suitable point of cutting the baseband path would be after the constellation points per tone/subcarrier were selected but before the iFFT was applied.

In the uplink the WiMAX (802.16) uses the same OFDMA modulation where the radio node would have to demodulate the different tones, apply the FEC such as Viterby or TC decoder and other techniques such as HARQ to decide on the received constellation from the user equipment and only then wraps it and sends it on the network.

Operation of One Embodiment
Downlink Operation:

In one embodiment, on the downlink the base station receives the information to be transmitted to the user's equipment from the network. The information is processed in the base station and modulated to be successfully transmitted to the user. The modulation is performed in a baseband processor/card/module referred also as base band block by the OBSAI architecture.

The baseband processor operation varies and is specific per standard such as GSM, EDGE, CDMA, CDMA2000, WCDMA, UMTS, LTE, 802.16 or other.

There are also slight variants in the baseband operation between different vendors each having his implementation and differentiators. The baseband block receives the data in relatively low rates of usually MBPS (mega bits per second) (usually 1-300 but not limited to) and sends it on its other side to an RF block in higher rates (usually 0.1-19 GBPS (Giga Bits per Second) but not limited to) or in analog format (either IF or baseband).

One embodiment splits the baseband operation such that much of the work which is done on the lower rates (such as lower and higher MAC and a big part of the PHY) will be done on the centralized base station while all higher rate processing will be done remotely on a remote radio node.

As such, at one of the last stages of the baseband processing at lower rate the data will be wrapped in any protocol to enable its successful transfer to a radio node (by the converter unit) where it will be unwrapped and the rest of the baseband processing will be completed (e.g. iFFT and optionally a mapper in OFDMA).

After completion in the radio node, the traffic will be passed to the RF block and be transmitted over the air.

In several cases the base band card is of third party and has an available output interface to connect to, connecting it to the RF block. In these cases it is easier to connect at this point and not internally in the base band processor.

In this case the converter unit will take the high rate data and reverse some of the last operations of the baseband processor to achieve again a lower rate of traffic (it can also compress the data in other methods not exactly identical to reverse baseband operation). Usually the converter can do this in a simplistic way, as the radio node will not need some of the processes done in high end base stations (such as CFR Crest Factor Reduction for high power PAs and more), which would make the rate reduction operation straight forward (similar actually to the first part of a client receiver).

Uplink Operation:

In one embodiment, on the uplink the radio node receives the transmissions from the client devices over the air in the designated protocol such as GSM, EDGE, CDMA, CDMA2000, WCDMA, UMTS, LTE, 802.16 or many other used proprietary or standard protocols.

The RF block of the radio node will transfer the information to the DSP unit in the radio node that will process the information, till the phase where the data rate is lowered to close to the information rate, or to a suitable level to be transferred over the selected network. Usually this will include the stages till a constellation decision is taken. This may include soft decision processing like Viterbi decoder or Turbo code decoder and de-mapper as well as FFT in several of the above standards.

After the rate has been lowered, the data is wrapped if needed and sent on the network connecting the radio node and converter unit. The converter will unwrap the data and transfer it to the right stage of the base band processing, or if using standard base band RF blocks interface it will inverse the operation done in the radio node in the simplest way (may not be exact reverse depending on implementation and interfaces on both sides) in order to transfer it back to higher rates and transfer it to the base band interface in the desired format and rate.

Even though it might look like a more significant part of the processing is being done in the radio node in the uplink compared to the downlink, the following two issues may simplify the uplink:

1. In Femtocells, Picocells and Microcells in many cases the link budget and system gains are unbalanced in favor for the uplink. As such in WiMAX femtocells, for example, the uplink of a femtocell during common use mode, may have an advantage of more than 10 dB-20 dB over the downlink, which would make its processing much easier.

2. In many applications the uplink and downlink rates are unbalanced and as such require much less processing from the uplink. For example, in WiMAX, after the FFT, the processing power required by the uplink processor is related directly to the information rate flowing in the modem.

In one embodiment, after data is transferred to the baseband block it continues to be processed as in standard base station processing.

In addition to the data flows in the uplink and downlink, additional information is exchanged between the baseband and radio node. Such information is usually per protocol and includes elements such as synchronization information, management and control information, calibration information and more. Many of these information elements for a few of the standards, are defined in the OBSAI RP3, RP3-01 and CPRI standards per communication standard.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

The embodiments are not limited in their applications to the details of the order or sequence of steps of operation of methods, or to details of implementation of devices, set in the description, drawings, or examples. Moreover, the individual blocks illustrated in the block diagrams herein may be functional in nature and do not necessarily correspond to discrete hardware elements.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents. In the claims, means-plus-function clauses are intended to cover the structures described herein as performing the recited function and not only structural equivalents, but also equivalent structures.

Insofar as the description above and the accompanying drawings disclose any additional matter that is not within the scope of the two claims below, the additional matter is not dedicated to the public and the right to file one or more applications to claim such additional inventions is reserved. Although two very narrow claims are presented herein, it should be recognized that the scope of this invention is much broader than presented by the claims. It is intended that broader claims will be submitted in an application that claims the benefit of priority from this application.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A radio equipped network appliance for providing a wireless client device with wireless connectivity to a cellular network, said appliance comprising:
   at least one antenna element configured to wirelessly exchange signals with the wireless client device;
   communication circuitry configured to engage in an IP based communication session with a network signal interface over an IP based distributed data network;
   signal processing circuitry configured to (1) de-packetize packets received from the network signal interface over the IP based distributed data network and containing first constellation points representing data intended for transmission to the wireless client, and (2) translate data wirelessly received from the wireless client into second constellation points, packetize the second constellation points and send the packetized constellation points to the network signal interface; and
   radio frequency (RF) circuitry for formatting, modulating and wirelessly transmitting to the wireless client device, one or more RF signals, bearing the data received in the form of packetized constellation points, from the network signal interface, over the IP based communication session;
   wherein the network signal interface:
   i. receives the first constellation points from a signal interceptor and processor configured to intercept baseband data, sent from a cellular network controller to a native radio unit of the cellular network, and generate, from the intercepted baseband data, the series of first constellation points representing data intended for the wireless client; and
   ii. receive the second constellation points from said network appliance, de-packetize the second constellation points and send the second constellation points to the signal interceptor and processor to be translated into baseband data and sent to the cellular network controller.

2. The appliance according to claim 1, wherein said radio equipped network appliance further transmits packetized uplink baseband data, derived from wireless signals received from the wireless client device, to the base station controller, over the communication session.

3. A cellular network signal interface comprising:
   receiving circuitry adapted to receive, from a signal interceptor, baseband data sent from a cellular network controller to a native radio unit of the cellular network and intercepted by the signal interceptor;
   signal processing circuitry configured for generating a series of constellation points representing data contained in the intercepted baseband data and intended for a wireless client; and
   communication circuitry configured to packetize the generated constellation points and to transmit the packetized constellation points, over an IP based distributed data network, to a radio equipped network appliance for formatting, modulating and transmitting to the wireless client device, over the air, by the radio equipped network appliance;
   wherein:
   said communication circuitry is further configured to receive, over the IP based distributed data network, packetized second constellation points from the radio equipped network appliance, which second constellation points represent data received by the radio equipped network appliance from the wireless client and de-packetize the second constellation points; and
   said signal processing circuitry is further adapted to translate the second constellation points into second baseband data and send the second baseband data to the cellular network controller.

4. A cellular network extender comprising:
   a signal interceptor comprising circuitry for intercepting baseband data, sent from a cellular network controller to a native radio unit of the cellular network;
   first signal processing circuitry configured to generate, from the intercepted baseband data, a series of constellation points representing data intended for a wireless client; and
   communication circuitry functionally associated with said interceptor and configured to packetize the series of constellation points and send the packetized series of constellation points to a radio equipped network appliance, over an IP based distributed data network, to be formatted, modulated and transmitted over the air to the wireless client device, by the radio equipped network appliance.

5. The cellular network extender according to claim 4, further comprising a signal injector to forward to the controller uplink baseband data received in the form of second packetized constellation points, from the network appliance, over the packet based distributed data network, which second packetized constellation points are derived from wireless signals received from the wireless client device.

6. A system for extending a wireless network comprising:
a network signal interface comprising:
first communication circuitry configured to receive a series of constellation points representing data intended for transmission to a wireless client;
signal processing circuitry configured to packetize the generated constellation points; and
second communication circuitry configured to transmit the packetized constellation points, over an IP based distributed data network; a radio equipped network appliance communicatively coupled to said network signal interface via the IP based distributed data network, said radio equipped network appliance comprising:
third communication circuitry configured to receive the packetized constellation points from said network signal interface, over the IP based distributed data network; and
radio frequency (RF) circuitry configured to format, modulate and transmit to the wireless client device, over the air, one or more RF signals, bearing the data received in the form of the packetized constellation points, from said network signal interface, over the IP based distributed data network;
a signal interceptor comprising circuitry for intercepting baseband data, sent from a cellular network controller to a native radio unit of the cellular network; and
second signal processing circuitry configured to generate, from the intercepted baseband data, the series of constellation points representing data intended for a wireless client.

7. The system according to claim 6, wherein the series of constellation points is received from a native component of a base station of the cellular network.

8. The system according to claim 6, wherein said radio equipped network appliance further transmits packetized uplink baseband data, derived from wireless signals received from the wireless client device, to the network signal interface, over the packet based distributed data network.

9. The system according to claim 6, wherein said radio equipped network appliance further transmits second packetized constellation points to the network signal interface, over the packet based distributed data network, wherein the second packetized constellation points are derived from wireless uplink signals received from the wireless client device.

* * * * *